United States Patent

[11] 3,627,946

[72] Inventors Nobuo Inoue;
Yuichi Sato, both of Tokyo, Japan
[21] Appl. No. 839,965
[22] Filed July 8, 1969
[45] Patented Dec. 14, 1971
[73] Assignee Nippon Telegraph and Telephone Public Corporation
Tokyo, Japan
[32] Priority July 9, 1968
[33] Japan
[31] 43/47615

[54] METHOD AND APPARATUS FOR ENCODING ASYNCHRONOUS DIGITAL SIGNALS

3 Claims, 7 Drawing Figs.

[52] U.S. Cl. 178/68, 325/38, 325/141, 325/321
[51] Int. Cl. H04b 1/04, H04b 1/16, H03k 13/00
[50] Field of Search 325/38, 141, 321; 178/68, 69.5, 6; 179/15.55, 15 AP, 15 BA, 15 BS; 332/11

[56] References Cited

UNITED STATES PATENTS

| | | | |
|---|---|---|---|
| 3,344,231 | 9/1967 | Dodd | 178/7.1 |
| 3,349,177 | 10/1967 | Cattermole | 178/68 |
| 3,519,938 | 7/1970 | Smith | 325/38 |

*Primary Examiner*—Richard Murray
*Assistant Examiner*—Kenneth W. Weinstein
*Attorney*—Chittick, Pfund, Birch, Samuels & Gauthier

ABSTRACT: In transmitting a digital signal, e.g. a digital signal on a PCM transmission line which is asynchronous with a clock signal, a first and a second state pulse trains respectively corresponding to one of the binary states of the digital signal are utilized and the output pulse trains of the asynchronous digital signal are represented by corresponding mode pulse trains in respective time slots. When the state of the pulse train of the asynchronous digital signal changes an indicating pulse representing the time of transition of the state of the asynchronous digital signal is inserted in a time slot following the time slot in which the state has changed. On the receiving terminal the mode pulse trains are constructed by utilizing the framing pulse as the reference signal.

INVENTORS
NOBUO INOUE
YUICHI SATO

BY Chittick, Pfund, Birch, Samuels & Gauthier
ATTORNEY

INVENTORS
NOBUO INOUE
YUICHI SATO
BY Chittick, Pfund, Birch, Samuels & Gauthier
ATTORNEY

INVENTORS
NOBUO INOUE
YUICHI SATO

BY Chittick, Pfund, Birch, Samuels & Gauthier
ATTORNEY

INVENTORS
NOBUO INOUE
YUICHI SATO
BY Chittick, Pfund, Birch, Samuels & Gauthier
ATTORNEY

METHOD AND APPARATUS FOR ENCODING ASYNCHRONOUS DIGITAL SIGNALS

BACKGROUND OF THE INVENTION

This invention relates to a method and apparatus for converting asynchronous digital signals into a pulse train having a PCM clock pulse repetition rate and transmitting said pulse train through a digital transmission line such as a PCM transmission line or the like. The aforesaid asynchronous digital signals, being not in synchronous relation with PCM clock pulse, include data signals, two-level facsimile signals and the like, and are hereinafter, termed as "the asynchronous digital signals." Of course, there are cases wherein the data signals, the two-level facsimile signals or the like are in synchronized relation with the PCM clock pulse, but those are of very special cases and not directly concerned with this invention.

Signals transmitted over a PCM transmission line generally take the form of pulse trains so that such signals are suitable for transmitting such digital signals as various data signals, two-level facsimile signals or the like which take only two states of 1 and 0. In transmitting asynchronous digital signals over the PCM transmission line, the asynchronous digital signals are sampled by a clock pulse of the PCM system and are then transmitted without being encoded or the time of transition of the asynchronous digital signals is quantized and is then encoded for transmission.

With the method wherein asynchronous digital signals are sampled and transmitted without being encoded, while the circuit is very simple, the time-quantizing error (or the ratio of the minimum interval between transitions of the asynchronous digital signals and the error caused by encoding the position of transition time) is represented by $f_d/2f_s$ (where $f_d$ represents the transmission speed of asynchronous digital signals or the data rate and $f_s$ the sampling frequency). Thus, in order to realize time-quantizing errors of less than ±10 percent, it is necessary to satisfy a relation $f_s \geq 5f_d$, which means that this method has low transmission efficiencies and is not suitable for the conversion of wide-band digital signals. Further, with this method, there is a probability of a long zero sequence over the PCM transmission line thus disenabling the regenerative repeater.

Among the methods of quantizing the time of transition and then transmitting it after encoding are included the Sliding Index Method (L. F. Travis and R. E. Yaeger: Wideband Data on T/ Carrier, BSTJ, Oct., 1965) and the Fixed Index Method (Higeta et al.: "An Encoding Method for PCM Data Terminals," The Joint Convention Transaction of the Four Electrical Institute of Japan, No. 2308, 1967). According to the sliding index method a transition of asynchronous digital signals is encoded by three bits with a transmission rate of the asynchronous digital signals of $f_s/n$ (where $n$ represents the number of bits required for encoding and $f_s$ represents the maximum sampling frequency which is equal to the clock frequency $f_0$ of the PCM system) and with the maximum quantizing error of $\pm 1/n \cdot 2_{n-1}$. This coding is described in detail in the patent to Pfeiffer and Yaeger No. 3,394,312. Thus, while the transmission rate is considerably improved, there are following problems. More particularly, since only the times of transition of the asynchronous digital signals are transmitted, the effect of digit errors on the repeated line is extremely large, the circuit construction of the encoding device is complicated and the transmission rate is limited to $f_s/3$, because, in order to limit the error within a limit of about ±10 percent, it is necessary to use at least 3 bits per one transition.

On the other hand, according to the fixed index method, as the state (1 or 0) of the asynchronous digital signals and the signal obtained by encoding the time of transition of said state are transmitted in prescribed time slots, so 3 bits are required per one transition as in the sliding index method. Among eight code patterns resulted from using 3 bits, two code patterns are utilized to indicate the state and the remaining six patterns are utilized to indicate the transition time. Consequently, the data rate of the asynchronous digital signals equals $f_s/n$ and the maximum quantizing error equals $\pm 1/2(2_{n-1})$. With this method, as the mode pulse train representing the data state is constantly sent out the effect of the error on the PCM transmission line is small whereby it is able to realize a data rate comparable with that of the sliding index method. However, there are such disadvantages that the maximum transmission speed is only $f_0/3$ just as in the sliding index method. Furthermore, the circuit construction of the device is more complicated than that of the sliding index method in that the digit errors on the repeated line causes large errors amounting to a maximum of three time slots. (The term "time slots" herein used means the time slots of pulse trains on the PCM transmission line).

SUMMARY OF THE INVENTION

It is therefore an object of this invention to provide a new and improved method and apparatus for encoding asynchronous digital signals having higher transmission speed than either the sliding index method or fixed index method.

According to this invention, in the PCM transmission line, a pulse train consisting of 10101010 ..., for example, is made to correspond to a 1 state of the asynchronous digital signals and a pulse train consisting of 01010101 ..., for example, to a 0 state. To reconstruct the original asynchronous digital signals from the pulse train on the PCM transmission line 1 or 0 state of the PCM pulse is detected at each time slot of the pulse train to determine whether the detected code is arranged according to the order of pulse trains representing the state of 1 or 0 of asynchronous digital signals. More particularly, the fact that the asynchronous digital signal has changed its state from 0 to 1 or from 1 to 0 can be detected by the fact that the pulse train on the PCM transmission line has changed from a pulse train representing 0 state to that representing 1 state or from a pulse train representing 1 state to that representing 0 state.

Further, to transmit this transition time more accurately, a PCM timing interval is divided into a plurality of time quanta and the time quantum at which the state of the asynchronous digital signal has changed is encoded into a corresponding code.

Upon occurrence of the change of state in the pulse train, the time-quantizing pulse or pulses are inserted instead of the pulse or pulses representing the state of the asynchronous digital signal. For example, one timing interval is divided into two equal halves and the 1 or 0 state of the pulse in the PCM transmission line is made to correspond to whether the time position at which the state of the asynchronous digital signal has changed is included in the early half or late half of the divided time slot interval, thus forming a pulse indicating the transition time. Upon detection of the change from a pulse train representing 0 or 1 state to another pulse train representing 1 state or 0 state in the PCM transmission line this pulse which indicates the transition time of state is inserted in the next time slot.

According to this method only 2 bits are required for encoding the asynchronous digital signal viz 1 bit for representing the transition of the state of the asynchronous signal and another 1 bit for representing the time position of transition, thus greatly increasing the transmission speed of the asynchronous digital signal. In addition, where more than 2 bits are employed to indicate the time position of transition it is able to greatly decrease the time quantizing error.

With this invention, the data rate or the transmission speed of the asynchronous digital signal is made to be equal to $f_s/n$ and the maximum quantizing error to be $1/n \cdot 2_n$. Comparing the novel method with the sliding index method and the fixed index method, since both of these known methods require 3 bits per one transition of the asynchronous digital signal the maximum data rate is only $f_s/3$ whereas according to the novel system only 2 bits are required per one transition where a maximum time-quantizing error of about ±10 percent is permissible so that the data rate can be increased up to $f_s/2$ which is 1.5 times as large as that of the sliding index method and the fixed index method. Furthermore, in the novel method, if 3 bits were alotted for each one transition as in the sliding index and fixed index methods, the time-quantizing error of the asynchronous signal could be reduced to one half of that of the sliding index method and of the fixed index method.

The following table shows the comparison between the novel method, sliding index method and the fixed index method from which it can be clearly noted that the novel method is more advantageous in the data rate as well as the maximum quantizing error.

Table

Comparison of the data rate of the novel method and the sliding index method and fixed index method

| | Maximum date rate | Maximum quantizing error (in %) where $n$ bits are allotted per one time of transition $n = 2$ | $n = 3$ | $n = 4$ |
|---|---|---|---|---|
| This invention | $f_s/2$ | ±12.5 | ±4.2 | ±1.6 |
| Sliding index method | $f_s/3$ | — | ±8.3 | ±3.1 |
| Fixed index method | $f_s/3$ | — | ±8.3 | ±3.1 |

Accordingly, one of the objects of this invention is to provide a novel encoding method for asynchronous digital signals which provide the transmitting capability of the signals at higher rate than those of prior methods without imposing any conditions upon such existing digital transmission lines as PCM transmission lines.

Another object of this invention is to provide a new and improved method of encoding asynchronous digital signals capable of decreasing errors and distortions of the codes in a PCM transmission line or the like.

Still another object of this invention is to provide a novel method of encoding asynchronous digital signals with a small pattern jitter in the PCM repeated lines.

A further object of this invention is to provide a novel method of encoding asynchronous digital signals capable of avoiding a long zero sequence in multiplexing and in addition capable of hybrid transmission of voice signals readily and at high efficiencies.

Yet another object of this invention is to provide a new and improved apparatus capable of readily encoding asynchronous digital signals with a simple construction.

In accordance with one aspect of this invention, there is provided a method of encoding an asynchronous digital signal which is asynchronous with a PCM clock signal and is transmitted therewith over a digital transmission line, said method comprising the steps of representing the state of said asynchronous signal by a first mode pulse train and a second mode pulse train respectively corresponding to predetermined binary states, dividing the time slot interval of said clock signal into a plurality of regions designated by predetermined pulses and inserting the pulse representing a region of a time slot interval in which the state of said digital signal has changed into the next succeeding time slot.

In accordance with another aspect of this invention there is provided an apparatus for encoding an asynchronous digital signal comprising means to generate a clock pulse, means to sample said asynchronous digital signal with the clock pulse from said clock pulse generating means, means to divide said clock pulse for generating and sending a framing pulse, means responsive to said framing pulse and said clock pulse to generate a mode pulse train corresponding to either 1 or 0 state, an encoding means supplied with said mode pulse train and the output from said sampling means, said encoding means operating to convert the output from said sampling means into a corresponding mode pulse train in accordance with the state of said asynchronous digital signal, said encoding means further operating to insert a predetermined region pulse representing a divided region of a time slot interval in which the state of said asynchronous digital signal has changed into the next succeeding time slot when said change in the state of said asynchronous digital signal is detected, and means to insert said framing pulse into the output from said encoding means.

In accordance with yet another aspect of this invention there is provided an apparatus for encoding a multiplex asynchronous digital signal.

BRIEF DESCRIPTION OF THE DRAWING

Further objects and advantages of the present invention will become apparent and this invention will be better understood from the following description, reference being made to the accompanying drawing in which.

DESCRIPTION OF THE PREFERRED EMBODIMENT

Figure 1:
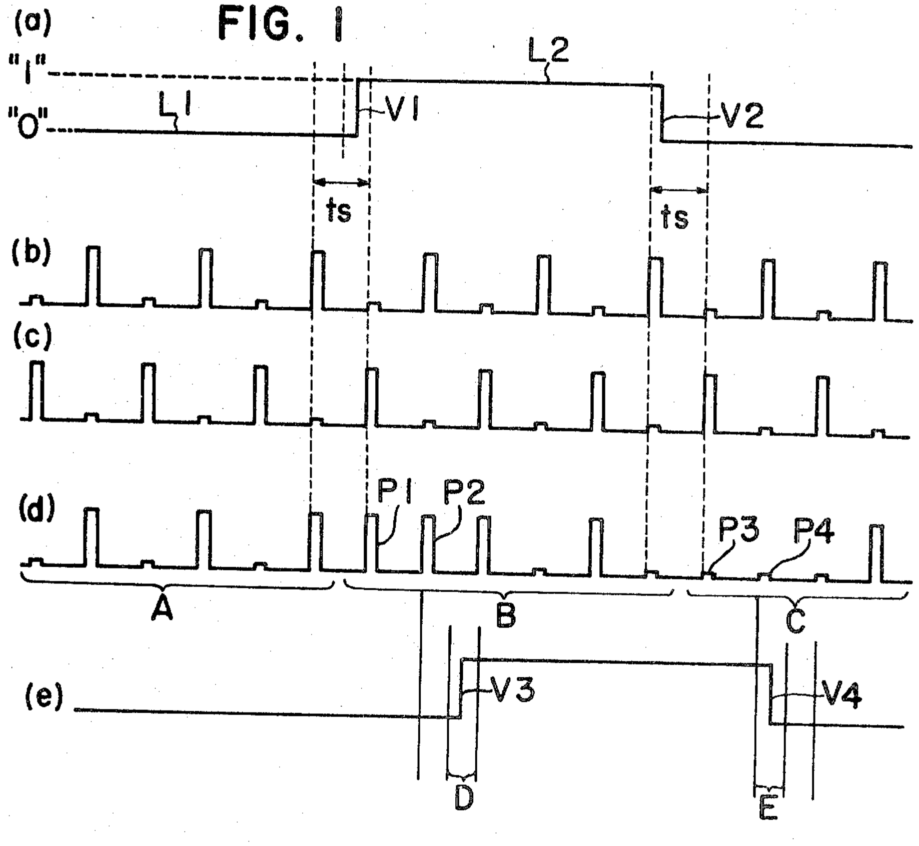
FIG. 1 is a graph of pulses helpful to explain the theory of this invention.

Referring now to FIG. 1 of the accompanying drawing there is shown a time chart illustrating a process of encoding an asynchronous digital signal for transmission over a PCM transmission line. FIG. 1 shows an example wherein only one channel of the asynchronous signal is sampled with a PCM clock frequency $f_o$ for transmission by the PCM system and wherein 2 bits are utilized per one transition. Waveform *a* of FIG. 1 shows the asynchronous digital signal in which level L1 represents a 0 state and level L2 a 1 state. Thus, V1 represents the time of transition from 0 to 1 state while V2 the time of transition from 1 to 0 state. Waveform *b* shows a pulse train corresponding to a 0 state or a code 010101..., while waveform *c* a pulse train corresponding to a 1 state or a code 101010 ... Thus, waveforms *b* and *c* are mode pulse trains and are related each other such that they are a logical NOT in respective time slots. Further, waveforms *b* and *c* are synchronous with a PCM bit stream in which $t_s$ represents the timing or bit interval. Waveform *d* represent an encoded pulse train or a PCM pulse train transmitted over the PCM transmission line. The asynchronous digital signal represented by waveform *a* is sampled with the PCM clock signal so that under the 0 state pulses of the time slots corresponding to the pulse train shown by waveform *b* are used, whereas under the 1 state pulses of the time slots corresponding to waveform *c* are used to construct a PCM pulse train as shown by waveform *d*. Portions A and C of the PCM pulse train shown by waveform *d* in FIG. 1 show the 0 state, corresponding to the pulse train shown by waveform *b*, whereas portion B shows the 1 state corresponding to the pulse train shown by waveform *c*. Pulses P2 and P4 are time pulses representing the positions of transition time of pulses and are not governed by the rule of the mode pulse trains shown by waveforms *b* and *c*. More particularly, the time interval $t_s$ of one time slot is divided into two equal halves so that where the time of transition of the asynchronous digital signal falls in the early half, the time indicating pulse is designated by a 0 for example whereas in the late half by a 1. In the waveform *d*, since the time of transition V1 falls in the late half of the time interval $t_s$ the pulse P2 is designated by a 1. On the other hand, since the time of transition V2 falls in the early half, pulse P4 is designated by a 0. Upon variation of the state of the asynchronous digital signal in the encoded PCM pulse train, the pulse train will change its state from waveform *b* to waveform *c* or vice verse, so that the first bit after the state change is utilized as a pulse for detecting the state change and the pulse of the next succeeding time slot is utilized as a time-indicating pulse. In order to more accurately indicate the time position of transition *k* bits following the second bit after state change may be utilized as the time-indicating pulses. In the waveform *d* shown in FIG. 1 the time indication is made by 1 bit so that at portion A a pulse train corresponding to waveform *b* appears whereas at portion B a pulse train corresponding to waveform *c* appears, such changes being detected by comparing pulse P1 with a pulse in the identical time slot of the waveform *b* or *c*. As a result, pulse P2 in the time slot succeeding to pulse P1 is utilized as the time-indicating pulse. In the same manner, at portion B a pulse train corresponding to waveform *c* appears and by comparing pulse P3 with a pulse in the identical time slot of waveform *b* or *c* to detect the fact that the mode pulse train has changed to a 0 mode pulse train corresponding to waveform *b* whereby the pulse P4 in the time slot succeeding to P3 is utilized as the transition time-indicating pulse.

To reconstruct the original asynchronous digital signal from the PCM pulse train having waveform *d*, the pulses in respective time intervals of waveform *d* are consecutively compared with the mode pulse train of waveform *b* or *c* to detect the change from waveform *b* to waveform *c* or vice versa to detect the mode transition of the original asynchronous digital signal. Thus, it will be noted that the pulse train at portion A corresponds to waveform *b* and that it is in a 0 state. Pulse P1 serves to detect the change of the state from 0 to 1 and pulse P2 serves to detect the fact that the state has changed in the late half of the corresponding time slot so as to set the time of transition of state 0 to state 1 in the late half D of the corresponding time slot, as shown in waveform *e*. The pulse train at portion B of waveform *d* corresponds to the pulse train shown by waveform *c* and shows that it is in a state 1. Pulse P3 functions to detect the change of the state to 0 and pulse P4 functions to detect the fact that such change of the state has been occurred in the early half of the corresponding time slot whereby to set the time of transition at which the state has changed from 1 to 0 in the early half E of the corresponding time slot. To minimize the time-quantizing error, times of transitions V3 and V4 are set at the center of respective halves D and E. In this manner, asynchronous digital signal *e* can be reconstructed from pulse train waveform *d*.

Generally, asynchronous digital signals are encoded into PCM code trains having waveforms as shown by waveform *d* in FIG. 1 at the transmitting terminal and decoded into the original asynchronous digital signals at the receiving terminal. In this case, since it is necessary to compare the PCM pulse train obtained from the PCM transmission line with a mode pulse train having a waveform *b* or *c* shown in FIG. 1 at the receiving terminal, it is necessary to produce correctly the pulse train having waveform *b* or *c* in the receiving terminal. This can be performed in the following manner. More particularly, with the PCM transmission system in order to effect framing, framing pulses of a constant repetition frequency are generally inserted at every N pulses in the PCM pulse train and such framing pulses are detected to effect framing at the receiving terminal. Since these framing pulses are inserted at every N pulses and can be detected very stably at the receiving terminal it is able to construct a mode pulse train having the waveform *b* or *c* shown in FIG. 1 by utilizing these framing pulses as a reference. These framing pulses are necessary in order to effect time division multiplexing the asynchronous digital signal or to effect hybrid transmission thereof with voice signals. However, such framing pulses are present in the conventional PCM system so that this invention is readily applicable to the existing PCM system.

According to another method of constructing a mode pulse train having the waveform *b* or *c* in the receiving terminal, the framing pulse train is not utilized, but instead, at the time of commencement of transmission of the asynchronous digital signal or at a prescribed time during such transmission, a 0 or 1 signal is sent from the transmitting terminal to the receiving terminal and at the receiving terminal a pulse train having the waveform *b* or *c* is constructed by utilizing the received pulse train of 0 or 1 as the reference. This method is especially suitable for such application where the asynchronous digital signal of only one channel is transmitted over the PCM transmission line wherein framing is not necessary.

Furthermore, in accordance with this invention, the mode pulse train includes alternate 1 and 0 pulses and since 0 pulses occur in succession only at the time of transition there is but little occurrence of a long zero sequence in the PCM transmission line, thus enabling stable PCM transmission.

Figure 2:
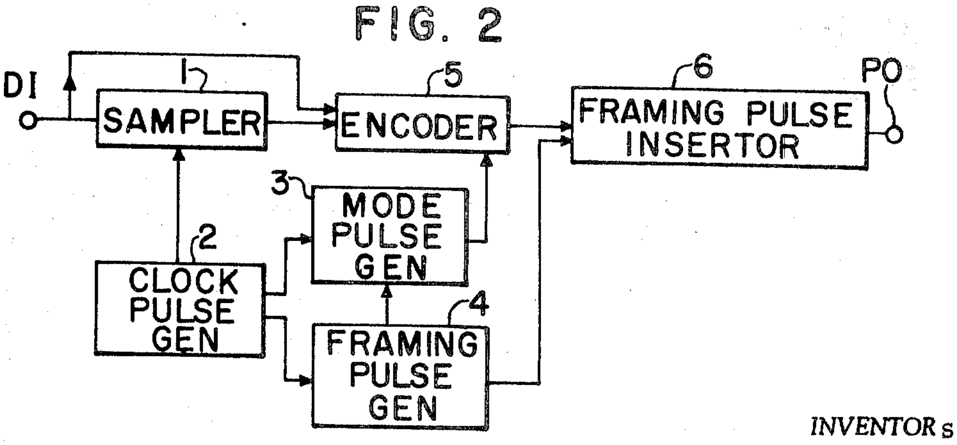
FIG. 2 shows a block diagram of an encoding apparatus provided on a transmission terminal and embodying this invention.

FIG. 2 illustrates a block diagram of one example of the apparatus at the transmitting terminal comprising an input terminal DI of the asynchronous digital signal, a sampler 1, a clock pulse generator 2, a mode pulse generator 3, a framing pulse generator 4, an encoder 5, a framing pulse inserter 6 and an output terminal PO of the PCM pulse train. The asynchronous digital signal applied to input the terminal DI is applied to sampler 1 to be sampled by the clock pulse from clock pulse generator 2 to detect the time position of transition. In the framing pulse generator 4, the pulse from the clock pulse generator 2 is divided to form a framing pulse of a predetermined constant repetition frequency and this framing pulse is utilized as a reference to construct a mode pulse train corresponding to a state 1 or a state 0 in the mode pulse generator 3. The encoder 5 operates to compare the sampled pulse train at the sampler 1 with the mode pulse train from the mode pulse generator 3 to encode the result of comparison and further to change it into a PCM pulse train by adding a time-indicating pulse in accordance with the principle as described above in connection with FIG. 1. At the framing pulse inserter 6 the framing pulse from the framing pulse generator 4 is inserted into the PCM pulse train and the resulted pulse train is sent out to the PCM transmission line through output terminal PO. In FIG. 2, the bypass line extending directly from the input terminal DI to the encoder 5 is an alternative used in case the transition time of the asynchronous digital signals should be applied to the encoder 5 with highly precise transition time, less than one-eighth (1/8) of one timing interval. This bypass line is unnecessary in case the required precision of the transition time of asynchronous digital signals is not so high.

Figure 3:
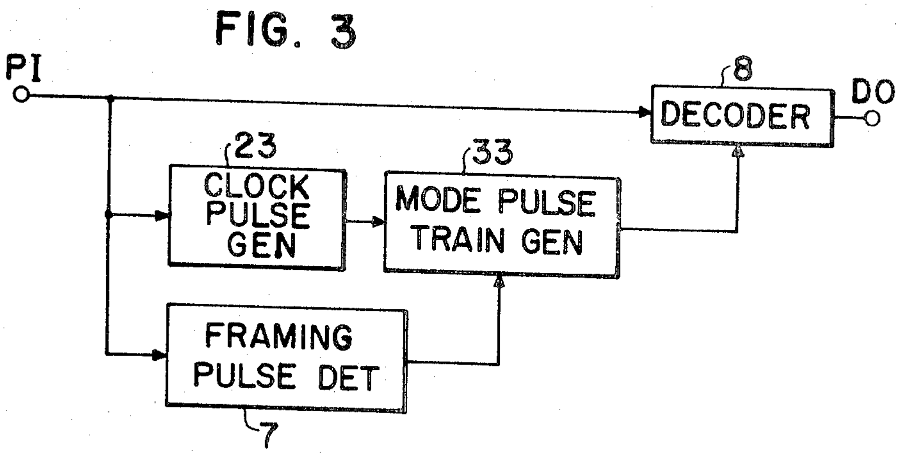
FIG. 3 shows a block diagram of a decoding apparatus on a receiving terminal.

FIG. 3 shows one example of the apparatus at the receiving terminal to be employed in this invention which comprises an input terminal PI for the PCM pulse train, a clock pulse generator 23, a framing pulse detector 7, a mode pulse train generator 33, a decoder 8, and an output terminal DO for the reconstructed asynchronous digital signal. Thus, the PCM pulse train received from the PCM transmission line is applied to the input terminal PI and clock pulse generator 23 operates to generate clock pulses which are synchronous with those generated on the transmitting terminal. The framing pulse detector 7 operates to detect framing pulses out of the PCM pulse train to construct in the mode pulse train generator 33 a mode pulse train by utilizing the detected framing pulse as the reference. The decoder 8 operates to compare the PCM pulse train with the mode pulse train from the mode pulse train generator 33 to detect the state of respective time slots and further to detect the time position of transition from the transition time indicating pulse, thus reconstructing the asynchronous digital signal which is to be sent out through output terminal DO.

Figure 4:
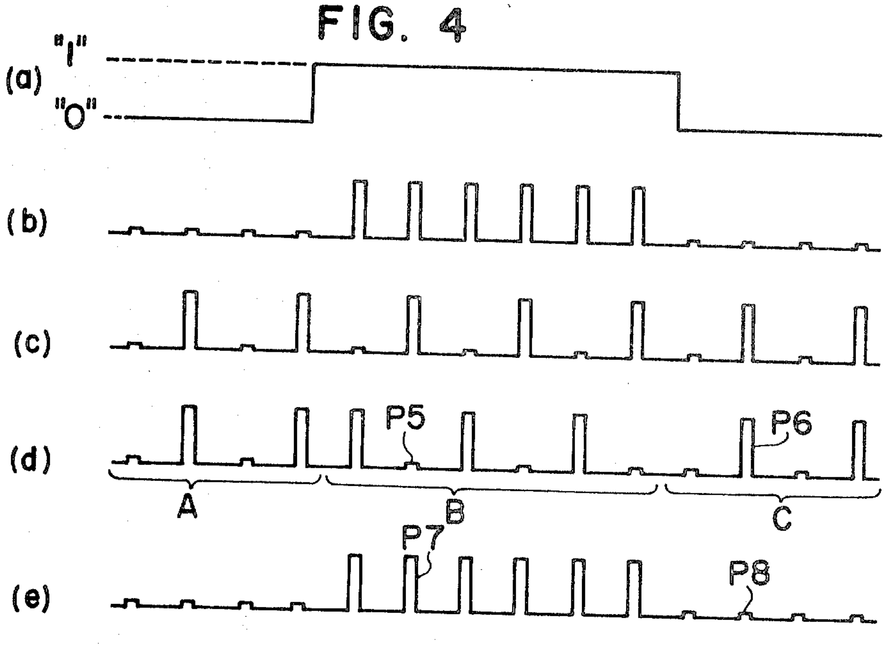
FIG. 4 is a graph of pulses to explain one example of the novel method of encoding.

FIG. 4 is a time chart illustrating the operational principle indicating that the encoding and decoding of this invention can be performed by means of an extremely simple circuit construction. Waveform *a*, FIG. 4, indicates an asynchronous digital signal, and *b* indicates a pulse train sampled by the clock pulse wherein a 0 state is indicated by a 0 pulse whereas a 1 state by a 1 pulse. Waveform *c* shows a mode pulse train indicating the 0 state, and waveform *d* represents a pulse train obtained by applying waveforms *b* and *c* to an exclusive OR logic circuit. The pulse train *d* obtainable by applying waveform *b* which is obtained by sampling waveform *a* and a 0 state mode pulse train *c* prepared beforehand to the exclusive OR logic circuit, is comprised by a portion A corresponding to the 0 state, a portion C corresponding to the 0 mode pulse train and a portion B corresponding to the 1 mode pulse train, thus indicating that the encoding operation shown in FIG. 1 is performed. In waveform *d* of FIG. 4, P5 and P6 represent time slots into which transition time indicating pulses are to be inserted. To reconstruct the asynchronous digital signal from the PCM pulse train shown by waveform *d*, the 0 mode pulse train *c* and waveform *d* constructed in the receiving terminal are applied to the exclusive OR logic circuit to obtain waveform *e*. Symbols P7 and P8 represent transition time indicating pulses and according to the encoding rule the state of the time slot for the pulse P7 is in the 1 state whereas that of the time slot for pulse P8 is in the state of 0. Waveform *e* is identical to waveform *b* so that it is easy to reconstruct the asynchronous digital signals from the pulse train shown by *e*.

As above described, in accordance with the encoding method of this invention, it is very easy to obtain a PCM pulse train from a sampled pulse train by means of an exclusive OR logic circuit.

Although in the foregoing embodiment, only one channel of the asynchronous digital signal was encoded it is to be understood that the invention is by no means limited to this particular case and that by the same principle it is able to encode *m* channels of the asynchronous digital signals to effect time division multiplexing. In this case, of course the data rate per channel decreases to 1/*m* of that of the case wherein only one channel is utilized for PCM transmission.

Figure 5:
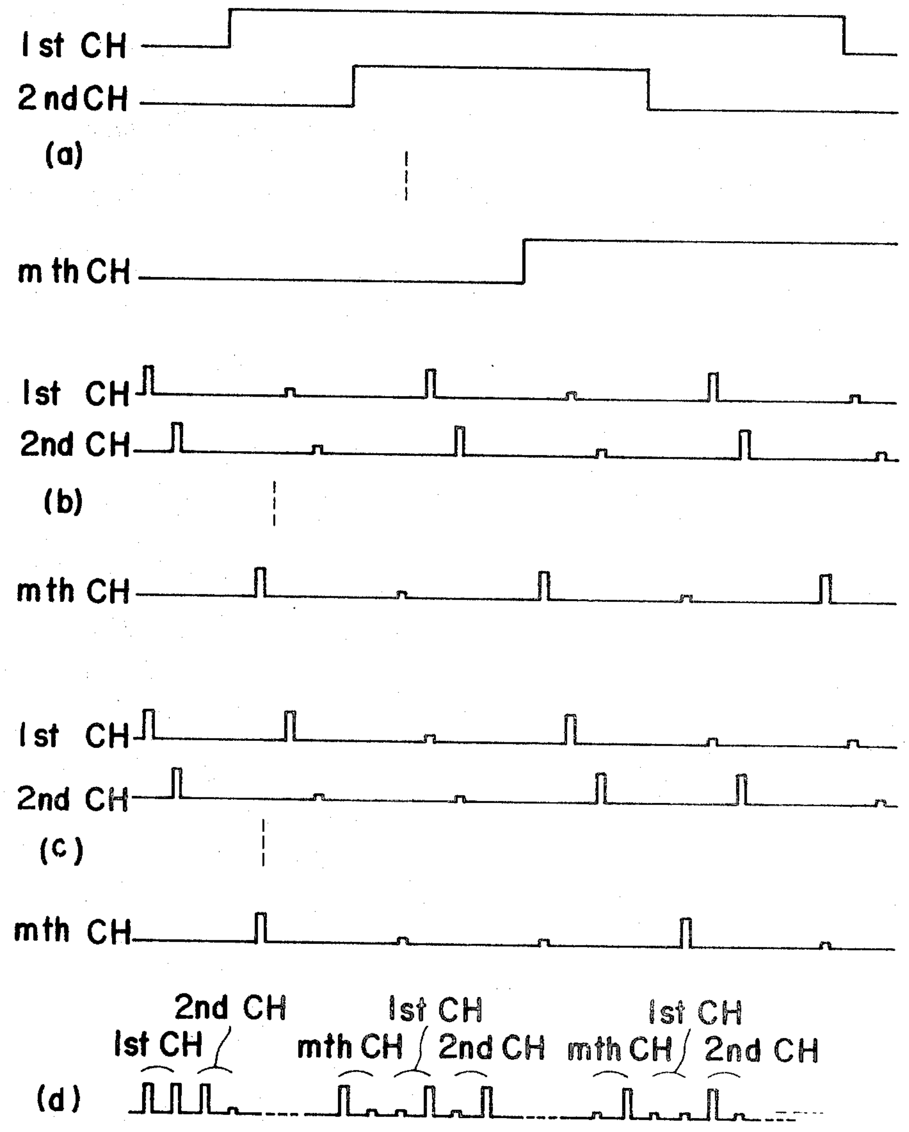
FIG. 5 shows a graph of pulses of a multiplex system embodying this invention.

FIG. 5 shows a time chart to illustrate a process of encoding wherein *m* channels are used to effect the time division multiplexing of the asynchronous digital signal. Waveform *a* in FIG. 5 shows the asynchronous digital signal in *m* channels, waveform *b* a mode pulse train assigned to each channel, waveform *c* a PCM pulse train encoded for each channel according to the principle shown in FIG. 1, and waveform *d* a multiplexed PCM pulse train. As the multiplexing system, wherein the first through *m*th channels are multiplexed for each bit unit is most simple, but as this system tends to form a long zero sequence, the accompanying drawing shows a system wherein the encoded signals are multiplexed in terms of two-bit units in order to avoid occurrence of such long zero sequence. More particularly, each pair of two bits of a PCM pulse train in each channel is multiplexed as shown by waveform *d* in FIG. 5 so as to avoid occurrence of long zero sequences.

Figure 6:
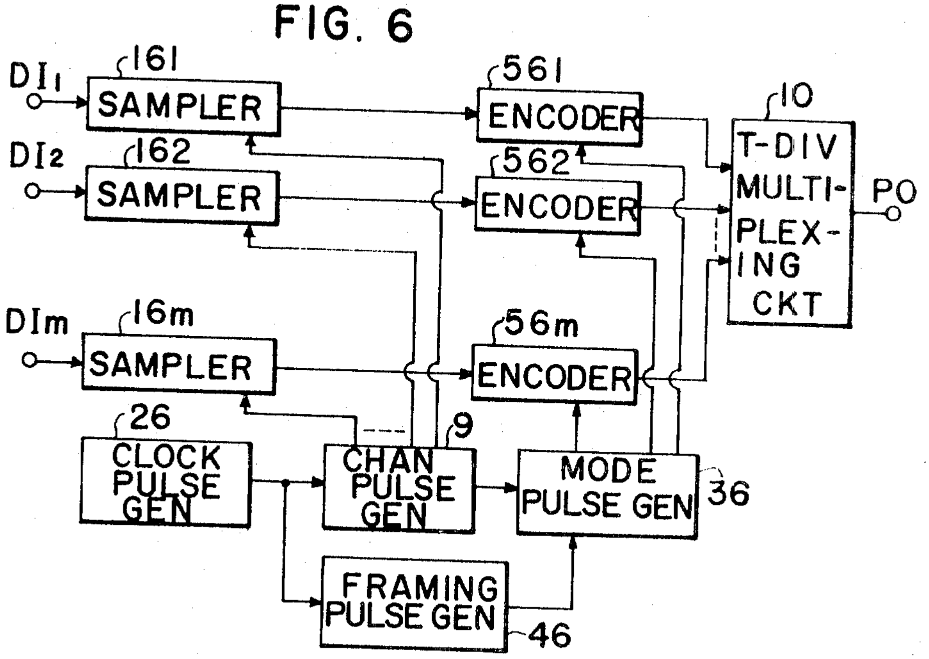
FIG. 6 is a block diagram of the encoding apparatus provided on the transmission terminal of the multiplex system and embodying this invention and FIG. 7 is a block diagram of the decoding apparatus on the receiving terminal of the multiplex system embodying this invention.

FIG. 6 is a block diagram of apparatus at the transmitting terminal of a *m* channel multiplexing system embodying the principle shown in FIG. 5. In FIG. 6, DI , DI , ... DI represents input terminals of asynchronous digital signals transmitted over *m* channels, 161, 162, ... 16*m* respectively represents samplers, 561, 562, 56*m* encoders, 26 a clock pulse generator, 9 *m* channel pulse generators, 46 a framing pulse generator, 10 a time division multiplexing circuit and PO an output terminal for the PCM pulse train. Respective asynchronous digital signals applied to input terminals $DI_1$, $DI_2$ ... $DI_m$ respectively through *m* channels are sampled in samplers 161, 162, ... 16*m* by the channel pulses from channel pulse generators 9 and the sampled signals are applied to encoders 561, 562, ... 56*m* respectively. Channel pulse generators 9 operate to divide clock pulses from clock pulse generator 26 into *m* channels to generate *m* channel pulses for respective channels which are dephased from each other by one time slot in the same manner as the mode pulse train shown by waveform *b* in FIG. 5. The mode pulse generator 36 operates to generate mode pulse trains for *m* channels as shown by waveform *c* in FIG. 5 by utilizing the framing pulse from the framing pulse generator 46 as the reference. These mode pulse trains are applied to respective encoders 561, 562, ... 56*m* for respective channels whereby to encode respective sampling pulses from samplers 161, 162, ... 16*m*. The encoded pulses are constructed into a multiplex PCM pulse train in the time division multiplexing circuit 10 according to the principle as shown in FIG. 5.

Figure 7:
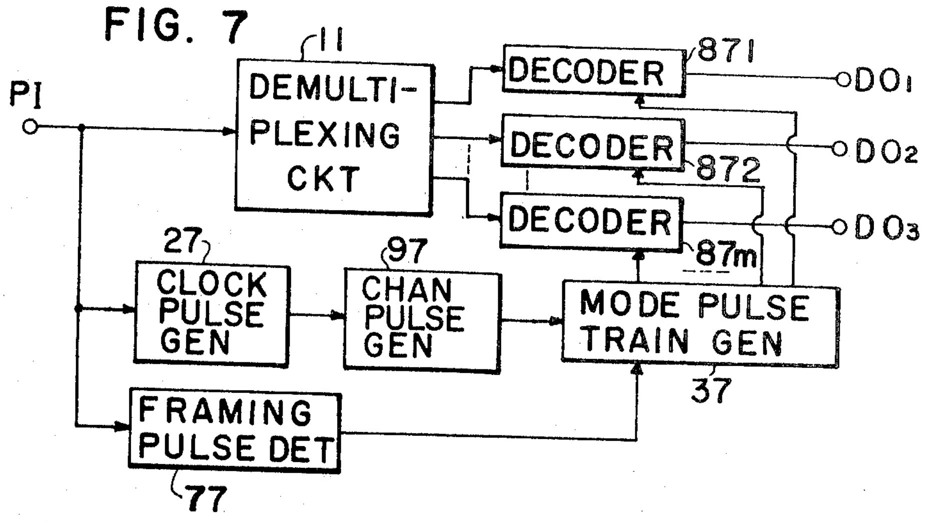

FIG. 7 shows a block diagram of one example of the decoding apparatus at a receiving terminal of a *m* channel multiplex system embodying the principle shown in FIG. 5. The apparatus shown in FIG. 7 comprises an input terminal PI to receive the PCM pulse train from the PCM transmission line, a clock pulse generator 27, a framing pulse detector 77, *m* channel pulse generators 97, a mode pulse train generator 37, a demultiplexing circuit 11, decoders 871, 872, ... 87*m* and output channels $DO_1$, $DO_2$, ... $DO_m$ for reconstructed asynchronous digital signals in *m* channels. The clock pulse generator 27 operates to form a clock pulse synchronized with the clock pulse at the transmitting terminal from the PCM pulse train received at the input terminal PI, the resulted clock pulse is divided into *m* channels to form *m* channel pulses by utilizing the framing pulse from the framing pulse detector 77 as the reference in the same manner as the apparatus on the transmitting terminal. On the other hand, the PCM pulse train is applied to the demultiplexing circuit 11 and is divided into pulse trains in *m* channels by the operation of the channel pulse from the channel pulse generator 97. Each one of the divided pulse trains is applied to corresponding one of channels 871, 872, ... 87*m*. The mode pulse train generator 37 operates to construct mode pulse trains in *m* channels from the channel pulse generated by the channel pulse generator 97 by utilizing the framing pulse generated by the framing pulse generator 77 as the reference, the resulted mode pulse trains being applied to corresponding decoders 871, 872, ... 87*m*, respectively. Decoders 871, 872, ... 87*m* in respective channels operate to compare the PCM pulse train with the mode pulse train to reconstruct the original asynchronous digital signals according to the principle described hereinbefore in connection with FIG. 1. The reconstructed asynchronous digital signals are applied to output terminal $DO_1$, $DO_2$, ... $DO_m$, respectively.

Generally, with the PCM system, voice signals are subject to the time division multiplexing so that hybrid transmission of the voice signal and the asynchronous digital signal is possible by applying the principle shown in FIG. 5 to certain channels. Especially, when the asynchronous digital signal is subject to two-bit units efficient multiplexing can be provided at unit of 2 bits × 4 because each voice channel is comprised by eight bits. In contrast, according to the conventional fixed index method inasmuch as multiplexing is effected in terms of 3-bit units the efficiency of multiplexing is extremely low.

Considering the application of this invention to the transmission of an asynchronous digital signal by an existing PCM 24 system (1,544 Mb/S) it is possible to transmit the high-speed asynchronous digital signals of 768 kb. (with the framing pulse) or 722 kb. (without the framing pulse), these transmission speeds being more than 1.5 times higher than 512 kb. which has heretobefore the limit of the prior sliding index method or fixed index method. In addition, if the novel method is used to transmit signals at a speed of 512 kb. the time-quantizing error of the signals can be reduced to one-half of that of the conventional methods.

Further, according to the novel method, the data rate per one channel of the voice signal amounts to 32 kb. which is more than five times as large as the limit or 6.2 kb. of the FDM carrier system or 1.5 times as large as the data rate of 21.3 kb. of the prior art sliding index system or fixed index system.

In the PCM system one voice channel signal is comprised by eight bits whereas according to the novel multiplexing method as the multiplexing is effected in terms of two-bit units it is possible to insert four sets of multiplexed pulses into time slots corresponding to one voice channel signal, thus enabling hybrid transmission of the voice signal and the asynchronous digital signal very readily and at high efficiencies.

With such a high-speed asynchronous digital signal transmission, it is able to realize computer to computer high-speed data communication.

Although in the above-described embodiment the asynchronous digital signals have been described as using two states of 0 and 1 as in the conventional data signal or two-level facsimile signals and the transmission line has been described to transmit binary pulses, as can be clearly understood from the foregoing description, the same principle can equally be applied to transmit an asynchronous digital signal with $n$ states with a $p$-ary digital transmission line. Thus, for example, where use is made of a $p$-ary pulse train of 1 digits it is able to construct P×1 mode pulse trains so that it is able to take out $n$ mode pulse trains to cause them to correspond to $n$ states of the asynchronous digital signal whereby to detect the transition of the state of the asynchronous digital signal in response to the change of the pulse train or if desired the time position of transition can be quantized and encoded for transmission. Such encoded pulse trains can be decoded by the same principle.

What is claimed is:

1. In a clocked PCM data transmission system for transmitting asynchronous digital signals, said system being of the type having means for sampling said signals for transitions of the state of said signals and upon detecting a transition transmitting at the next clock pulse a pulse representing said transition and at the next successive clock pulse transmitting a pulse representing a time region in which said transition occurred within the clock pulse interval, the improved method comprising:

developing a mode pulse train consisting of alternate ONES and ZEROS at the clock interval to represent one state of the data signal with the other state of the data signal represented by the logical NOT of said mode pulse train;

transmitting said mode pulse train to represent one state of said data signal in the absence of a transition in said data signal;

sampling said data signal at clock rate to detect said transitions and obtain a data-clocked pulse train representing said data signal;

combining by exclusive OR logic said mode pulse train and said data-clocked pulse train to alter the transmitted pulse train in accordance with said exclusive OR output except for said next successive pulse to represent the other state of said data signal.

2. In apparatus for encoding an asynchronous digital signal characterized by having means to generate a clock pulse, means to sample said asynchronous digital signal with the clock pulse from the clock pulse generating means to produce sampled data pulses, means to divide said clock pulse for generating a framing pulse, and means for providing after a first sampled data pulse in the next clock pulse time following a transition a coded region pulse in the next successive clock pulse time representing a predetermined divided region of a time slot interval in which the state of said asynchronous digital signal changed, the improvement comprising: means responsive to said framing pulse and said clock pulse to generate a mode pulse train consisting of alternate ONES and ZEROS or vice versa corresponding to either 1 or 0 state, an encoding means supplied with said mode pulse train and said sampled data pulses, said encoding means operating to combine the signals supplied thereto in exclusive OR logic to produce one of said corresponding mode pulse trains in accordance with the state of said asynchronous digital signal, and means to insert said framing pulse into the output from said encoding means.

3. Apparatus for encoding and multiplexing $m$-channel asynchronous digital signals characterized by apparatus according to claim 2 for each of said channels, said clock pulse generating means being common to all channels and further comprising means responsive to said clock pulse to generate $m$ channel pulses, means to sample the asynchronous digital signals in each channel in response to each channel pulse generated by said channel pulse generating means, and multiplexing means to multiplex all outputs from said encoding means into a multiplex pulse train each frame consisting of two bits of $m$ channels.

* * * * *

PO-1050
(5/69)

UNITED STATES PATENT OFFICE
CERTIFICATE OF CORRECTION

Patent No. 3,627,946 Dated December 14, 1971

Inventor(s) Nobuo Inoue and Yuichi Sato

It is certified that error appears in the above-identified patent and that said Letters Patent are hereby corrected as shown below:

Column 3, line 21, "date" should be -- data --;

Column 3, line 23, in the Table, "n=3n" should be -- n=3 --;

Column 7, line 59, "DI, DI, ... DI" should be -- $DI_1$, $DI_2$, ... $DI_m$ --.

Signed and sealed this 21st day of November 1972.

(SEAL)
Attest:

EDWARD M.FLETCHER,JR.
Attesting Officer

ROBERT GOTTSCHALK
Commissioner of Patents